United States Patent
Xu et al.

(10) Patent No.: US 9,584,231 B2
(45) Date of Patent: Feb. 28, 2017

(54) INTEGRATED TWO DIMENSIONAL ACTIVE ANTENNA ARRAY COMMUNICATION SYSTEM

(71) Applicant: Samsung Electronics Co., Ltd., Suwon-si, Gyeonggi-do (KR)

(72) Inventors: Gang Xu, Allen, TX (US); Robert Monroe, Melissa, TX (US); Ioannis Tzanidis, Dallas, TX (US); Jianzhong Zhang, Plano, TX (US); Yang Li, Plano, TX (US); Jin Yuan, Richardson, TX (US); Eko Onggosanusi, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/817,018

(22) Filed: Aug. 3, 2015

(65) Prior Publication Data
US 2016/0127003 A1    May 5, 2016

Related U.S. Application Data

(60) Provisional application No. 62/072,853, filed on Oct. 30, 2014.

(51) Int. Cl.
*H04M 1/00* (2006.01)
*H04B 17/11* (2015.01)
(Continued)

(52) U.S. Cl.
CPC ............. *H04B 17/11* (2015.01); *H01Q 1/246* (2013.01); *H01Q 3/36* (2013.01); *H01Q 21/28* (2013.01);
(Continued)

(58) Field of Classification Search
CPC ......... H01Q 1/246; H01Q 21/061; H01Q 3/26
USPC .. 455/562, 560, 101, 561, 562.1, 50.1, 13.3, 455/9, 63.4, 575.7, 100; 343/792.5, 797, 343/799, 790; 375/375, 296; 342/377, 342/368, 378; 370/330
See application file for complete search history.

(56) References Cited

U.S. PATENT DOCUMENTS

| | | | |
|---|---|---|---|
| 5,619,503 A * | 4/1997 | Dent ..................... | H01Q 1/246 370/330 |
| 6,295,035 B1 * | 9/2001 | Holzheimer ............. | G01S 3/02 343/792.5 |

(Continued)

OTHER PUBLICATIONS

International Search Report and Written Opinion issued for PCT/KR2015/011411 dated Feb. 17, 2016, 9 pgs.

*Primary Examiner* — Tan H Trinh

(57) ABSTRACT

A base station (BS) capable of communication with a number of transmission points includes a processor configured to control a beamforming transmission or reception and an integrated antenna array system. The integrated antenna array system includes a baseband signal processing unit configured to perform baseband functions and disposed between the two sections. The integrated antenna array system also includes a plurality of physical antenna elements disposed in groups. Each of the groups includes an equal number of the plurality of physical antenna elements. The plurality of physical antenna elements are disposed symmetrically around the baseband signal processing unit.

21 Claims, 14 Drawing Sheets

(51) Int. Cl.
  *H01Q 3/36* (2006.01)
  *H01Q 1/24* (2006.01)
  *H01Q 21/28* (2006.01)
  *H04B 17/391* (2015.01)
  *H04B 7/06* (2006.01)

(52) U.S. Cl.
  CPC ....... *H04B 17/3912* (2015.01); *H04B 7/0617* (2013.01)

(56) References Cited

U.S. PATENT DOCUMENTS

| | | | | |
|---|---|---|---|---|
| 2001/0041595 A1* | 11/2001 | Ikeda | ............... | H04B 7/0491 455/562.1 |
| 2003/0134664 A1* | 7/2003 | Zancewicz | ............... | H01Q 3/26 455/562.1 |
| 2004/0160374 A1* | 8/2004 | Johansson | ............... | H01Q 1/246 343/757 |
| 2004/0219892 A1 | 11/2004 | Vaidyanathan et al. | | |
| 2005/0219122 A1* | 10/2005 | Kawasaki | ............... | H04B 7/0854 342/378 |
| 2007/0135167 A1* | 6/2007 | Liu | ............... | H01Q 3/2617 455/562.1 |
| 2009/0231197 A1* | 9/2009 | Richards | ............... | H01Q 3/2682 342/377 |
| 2011/0244801 A1* | 10/2011 | Utagawa | ............... | H03C 3/227 455/42 |
| 2011/0274146 A1* | 11/2011 | Huang | ............... | H01Q 5/378 375/219 |
| 2012/0039370 A1* | 2/2012 | Kishimoto | ............... | H04B 7/0615 375/219 |
| 2012/0162008 A1* | 6/2012 | Eom | ............... | H04B 7/10 342/361 |
| 2012/0280861 A1* | 11/2012 | Kishimoto | ............... | H04B 7/0682 342/368 |
| 2012/0287978 A1* | 11/2012 | O'Keeffe | ............... | H01Q 21/245 375/222 |
| 2013/0033296 A1* | 2/2013 | Kishimoto | ............... | H01P 1/18 327/237 |
| 2013/0120191 A1* | 5/2013 | Zhang | ............... | H04B 7/0469 342/377 |
| 2013/0265195 A1* | 10/2013 | Kenington | ............... | H01Q 1/246 342/368 |
| 2013/0285867 A1* | 10/2013 | Wang | ............... | H01Q 1/246 343/770 |
| 2013/0301487 A1 | 11/2013 | Khandani | | |
| 2014/0016731 A1* | 1/2014 | Okada | ............... | H03L 7/24 375/375 |
| 2014/0184457 A1* | 7/2014 | Lea | ............... | H01Q 9/285 343/747 |
| 2014/0203969 A1* | 7/2014 | Maltsev | ............... | H01Q 3/36 342/375 |
| 2014/0313081 A1* | 10/2014 | Tan | ............... | H01Q 3/00 342/377 |
| 2015/0036763 A1* | 2/2015 | Kang | ............... | H04B 7/0413 375/295 |
| 2015/0288438 A1* | 10/2015 | Maltsev | ............... | H01Q 3/40 455/101 |
| 2015/0326299 A1* | 11/2015 | Petersson | ............... | H04B 7/0617 370/329 |
| 2015/0333884 A1* | 11/2015 | Athley | ............... | H04L 5/0048 375/295 |
| 2016/0142124 A1* | 5/2016 | O'Keeffe | ............... | H04B 17/0085 455/562.1 |

* cited by examiner 8H x 4V Alt. pol.

INTEGRATED TWO DIMENSIONAL ACTIVE ANTENNA ARRAY COMMUNICATION SYSTEM

CROSS-REFERENCE TO RELATED APPLICATION(S) AND CLAIM OF PRIORITY

The present application claims priority to U.S. Provisional Patent Application Ser. No. 62/072,853 filed Oct. 30, 2014 entitled "INTEGRATED 2D ACTIVE ANTENNA ARRAY COMMUNICATION SYSTEM". The content of the above-identified patent document is incorporated herein by reference.

TECHNICAL FIELD

The present application relates generally to wireless communication systems and, more specifically, to an integrated two-dimensional active antenna array communication system.

BACKGROUND

The rapid growth of data traffic driven by mobile devices poses challenges on capacity of wireless networks. Multi-input-multi-output (MIMO) and multiuser MIMO (MU-MIMO) are key technologies introduced in the 3GPP LTE and LTE-advanced systems to improve spectral efficiency. In current MIMO systems, an evolved Node B (eNB) is usually equipped with a linear array with antenna elements placed in a horizontal line, and the eNB exploits spatial diversity in the azimuth (horizontal) domain. In contrast, deploying antennas vertically allows eNBs to utilize diversity in elevation domain by, for example, elevation beamforming, achieving up to 30% gain in system capacity.

SUMMARY

In a first embodiment, an integrated antenna array system is provided. The integrated antenna array system includes a baseband signal processing unit configured to perform baseband functions. The integrated antenna array system also includes a plurality of physical antenna elements disposed in groups. Each of the groups includes an equal number of the plurality of physical antenna elements. The groups are disposed symmetrically around the baseband signal processing.

In a second embodiment, a base station (BS) is provided. The BS includes a processor configured to control a beamforming transmission or reception and an integrated antenna array system. The integrated antenna array system includes a baseband signal processing unit configured to perform baseband functions and disposed between the two sections. The integrated antenna array system also includes a plurality of physical antenna elements disposed in groups. Each of the groups includes an equal number of the plurality of physical antenna elements. The groups are disposed symmetrically around the baseband signal processing.

Other technical features may be readily apparent to one skilled in the art from the following figures, descriptions, and claims. Definitions for other certain words and phrases are provided throughout this patent document. Those of ordinary skill in the art should understand that in many if not most instances, such definitions apply to prior as well as future uses of such defined words and phrases.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged Wireless.

The following documents and standards descriptions are hereby incorporated into the present disclosure as if fully set forth herein: Vuokko, V. -M. Kolmonen, J. Kivinen, and P. Vainikainen, "Results from 5.3 GHz MIMO measurement campaign," presented at COST 273 TD(04)193, Duisburg, 2004 (REF 1); Young-Han Nam, Boon Loong Ng, Krishna Sayana, Yang Li, Jianzhong (Charlie) Zhang, Younsun Kim and Juho Lee, "Full Dimension MIMO (FD-MIMO) for Next Generation Cellular Technology", Communications Magazine, IEEE, vol. 51, no. 6, pp. 172,179, Jun. 2013 (REF 2); and U.S. Pat. No. 6,351,243 B1 entitled "Sparse array antenna" and naming Anders Derneryd and Björn Gunnar Johannisson as inventors (REF 3). The contents of which are hereby incorporated by reference in their entirety.

Embodiments of the present disclosure provide a novel architecture for large two-dimensional (2D) antenna array communication system. According to certain embodiments, an active antenna array is divided into two sections that are physically separated by the baseband unit. The distance between the two antenna array sections is larger than one wavelength (1λ). This separation provides two key benefits. First, the baseband unit is connected to the active antenna transceiver units using symmetric traces. Therefore routing is symmetric and easy to implement despite the large size of the antenna array. Secondly, the larger than 1λ non-uniform (inter-section) spacing enhances system performance (higher capacity) despite the occurrence of side lobes. Typically, active antenna arrays employ uniform antenna spacing, smaller than 1λ, to avoid side lobes and grating lobes.

Figure 1:
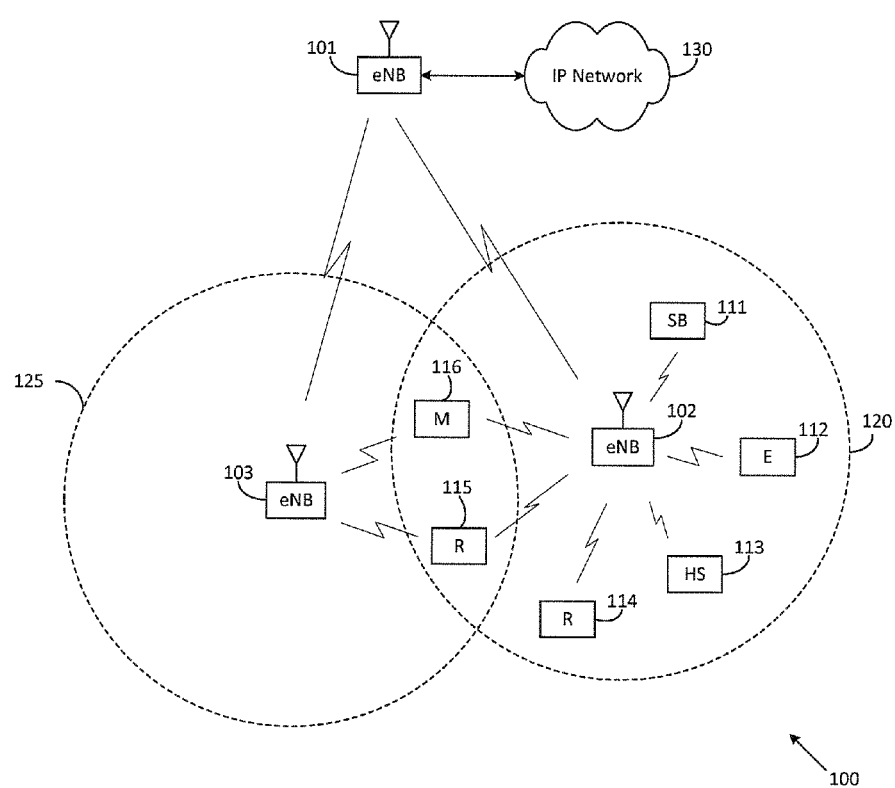
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of eNBs 101, 102 and 103 are utilize an integrated 2D active antenna array architecture to communicate with one or more of UEs 111, 112, 113, 114, 115 and 116. In certain embodiments, one or more of UE 111, 112, 113, 114, 115 and 116 include an integrated 2D active antenna array architecture to communicate with one or more of eNBs 101, 102 or eNB 103.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
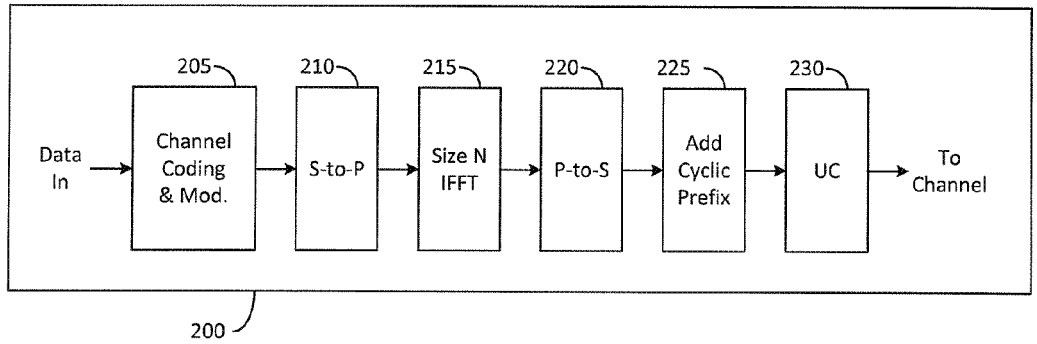
FIGS. 2A and 2B illustrate example wireless transmit and receive paths according to this disclosure.
Figure 2B:
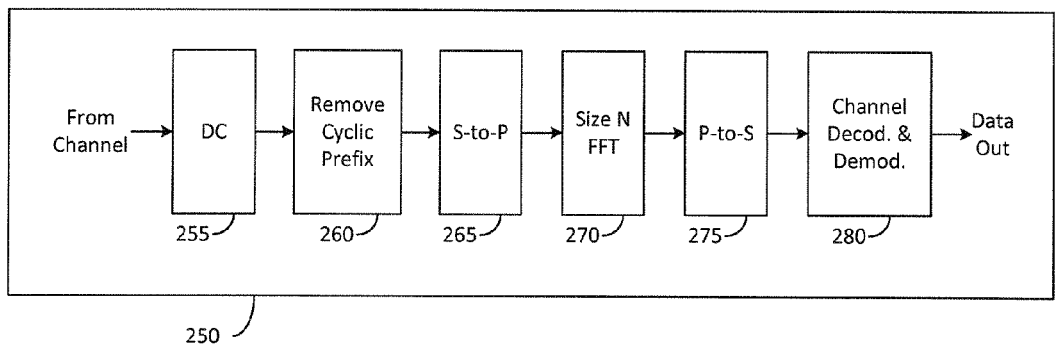

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured to communicate via an integrated 2D active antenna array architecture.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
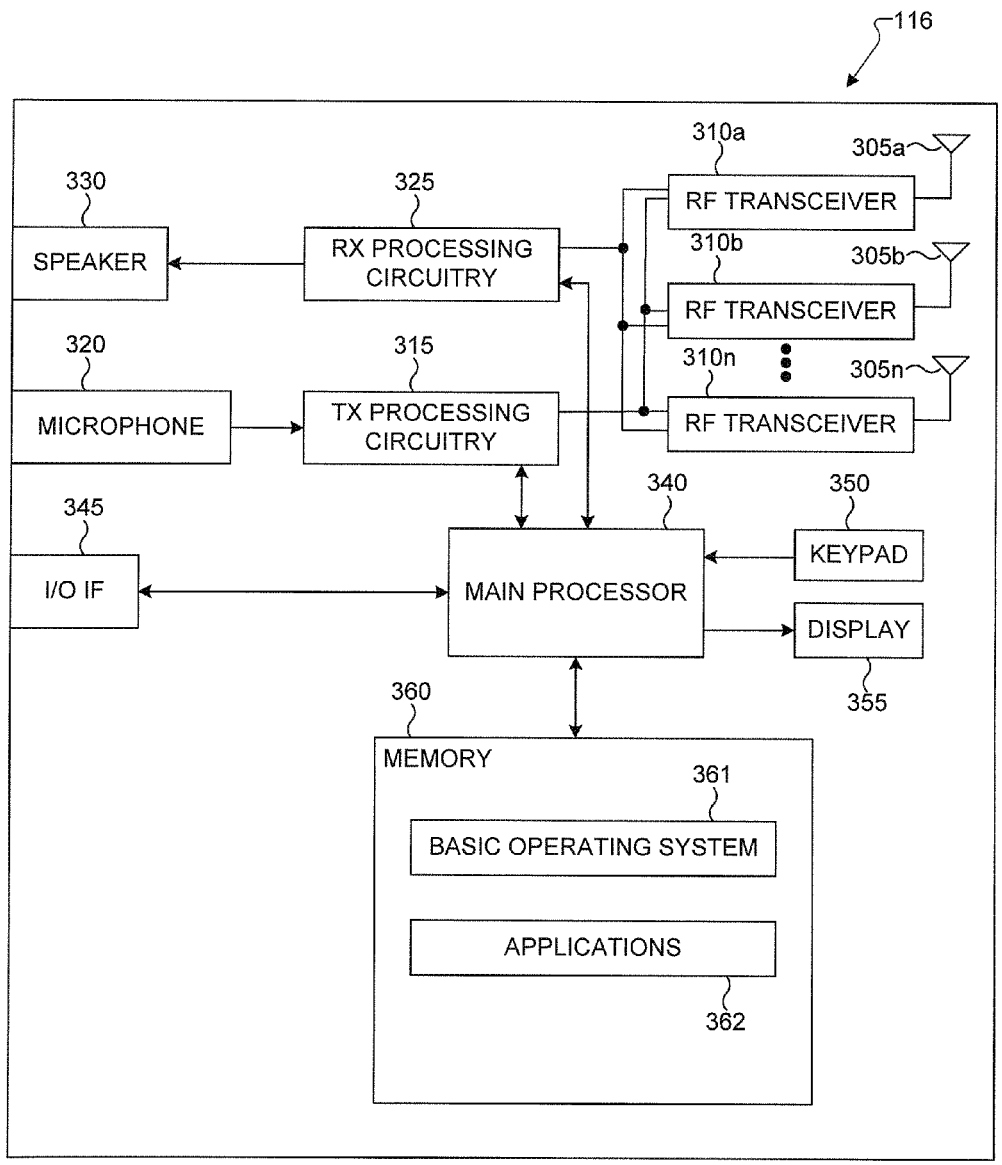
FIG. 3 illustrates an example user equipment (UE) according to this disclosure.

FIG. 3 illustrates an example UE 116 according to this disclosure. The embodiment of the UE 116 illustrated in FIG. 3 is for illustration only, and the UEs 111-115 of FIG. 1A could have the same or similar configuration. However, UEs come in a wide variety of configurations, and FIG. 3 does not limit the scope of this disclosure to any particular implementation of a UE.

The UE 116 includes multiple antennas 305a-305n, radio frequency (RF) transceivers 310a-310n, transmit (TX) processing circuitry 315, a microphone 320, and receive (RX) processing circuitry 325. The TX processing circuitry 315 and RX processing circuitry 325 are respectively coupled to each of the RF transceivers 310a-310n, for example, coupled to RF transceiver 310a, RF transceiver 210b through to a $N^{th}$ RF transceiver 310n, which are coupled respectively to antenna 305a, antenna 305b and an $N^{th}$ antenna 305n. In certain embodiments, the UE 116 includes a single antenna 305a and a single RF transceiver 310a. In certain embodiments, the single antenna 305a or multiple antennas 305a-305n comprise an integrated 2D active antenna array architecture. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceivers 310a-310n receive, from respective antennas 305a-305n, an incoming RF signal transmitted by an eNB or AP of the network 100. In certain embodiments, each of the RF transceivers 310a-310n and respective antennas 305a-305n is configured for a particular frequency band or technological type. For example, a first RF transceiver 310a and antenna 305a can be configured to communicate via a near-field communication, such as BLUETOOTH®, while a second RF transceiver 310b and antenna 305b can be configured to communicate via a IEEE 802.11 communication, such as Wi-Fi, and another RF transceiver 310n and antenna 305n can be configured to communicate via cellular communication, such as 3G, 4G, 5G, LTE, LTE-A, or WiMAX. In certain embodiments, one or more of the RF transceivers 310a-310n and respective antennas 305a-305n is configured for a particular frequency band or same technological type. The RF transceivers 310a-310n down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceivers 310a-310n receive the outgoing processed baseband or IF signal from the TX processing circuitry 315 and up-converts the baseband or IF signal to an RF signal that is transmitted via one or more of the antennas 305a-305n.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceivers 310a-310n, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for communicating via an integrated 2D active antenna array architecture. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The user of the UE 116 can use the keypad 350 to enter data into the UE 116. The display 355 can be a liquid crystal display or other display capable of rendering text or at least limited graphics, such as from web sites, or a combination thereof.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
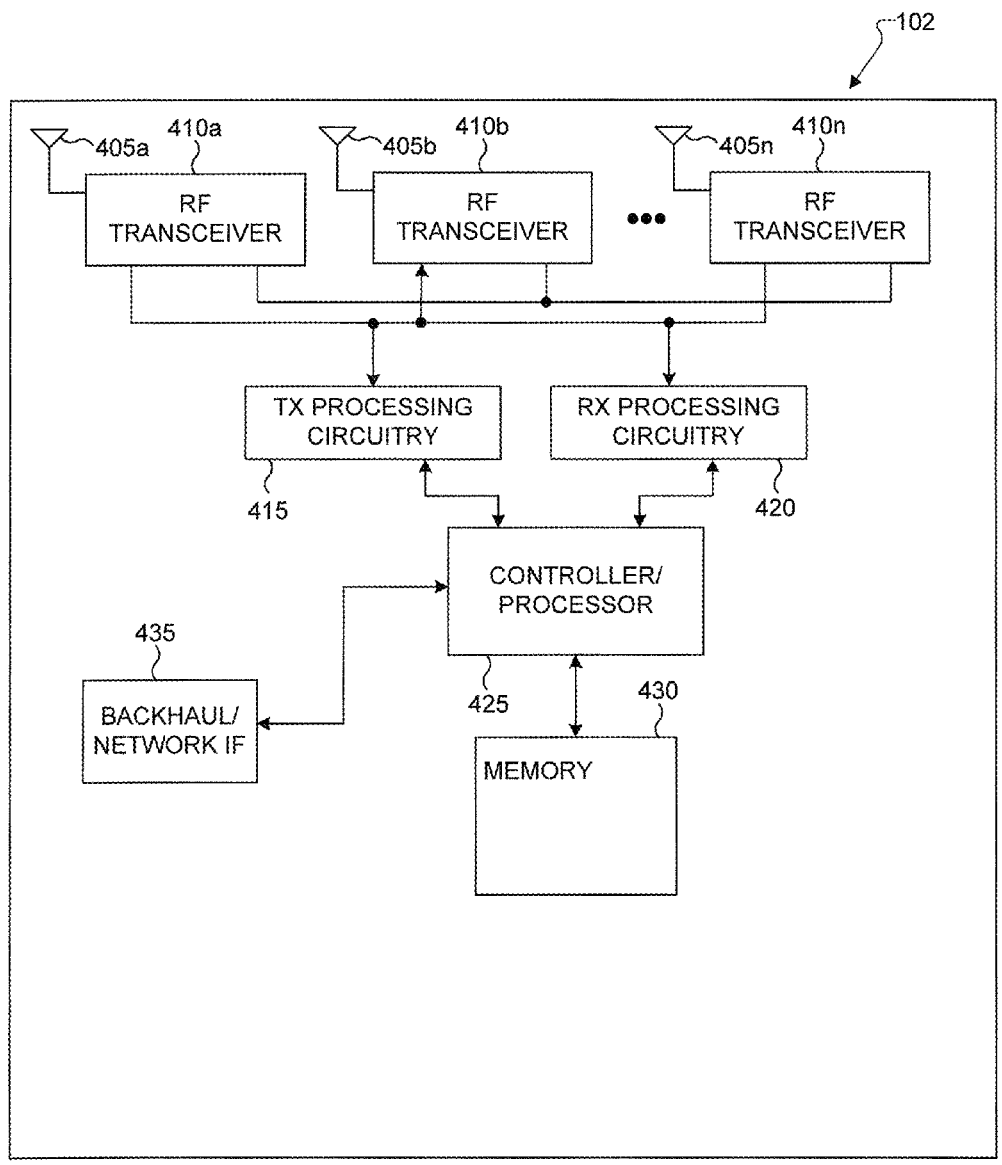
FIG. 4 illustrates an evolved Node B (eNB) according to this disclosure.

FIG. 4 illustrates an example eNB 102 according to this disclosure. The embodiment of the eNB 102 shown in FIG. 4 is for illustration only, and other eNBs of FIG. 1 could have the same or similar configuration. However, eNBs come in a wide variety of configurations, and FIG. 4 does not limit the scope of this disclosure to any particular implementation of an eNB.

The eNB 102 includes multiple antennas 405a-405n, multiple RF transceivers 410a-410n, transmit (TX) processing circuitry 415, and receive (RX) processing circuitry 420. The eNB 102 also includes a controller/processor 425, a memory 430, and a backhaul or network interface 435. In certain embodiments, the multiple antennas 405a-405n comprise an integrated 2D active antenna array architecture.

The RF transceivers 410a-410n receive, from the antennas 405a-405n, incoming RF signals, such as signals transmitted by UEs or other eNBs. The RF transceivers 410a-410n down-convert the incoming RF signals to generate IF or baseband signals. The IF or baseband signals are sent to the RX processing circuitry 420, which generates processed baseband signals by filtering, decoding, and/or digitizing the baseband or IF signals. The RX processing circuitry 420 transmits the processed baseband signals to the controller/processor 425 for further processing.

The TX processing circuitry 415 receives analog or digital data (such as voice data, web data, e-mail, or interactive video game data) from the controller/processor 425. The TX processing circuitry 415 encodes, multiplexes, and/or digitizes the outgoing baseband data to generate processed baseband or IF signals. The RF transceivers 410a-410n receive the outgoing processed baseband or IF signals from the TX processing circuitry 415 and up-converts the baseband or IF signals to RF signals that are transmitted via the antennas 405a-405n.

The controller/processor 425 can include one or more processors or other processing devices that control the overall operation of the eNB 102. For example, the controller/processor 425 could control the reception of forward channel signals and the transmission of reverse channel signals by the RF transceivers 410a-410n, the RX processing circuitry 420, and the TX processing circuitry 415 in accordance with well-known principles. The controller/processor 325 could support additional functions as well, such as more advanced wireless communication functions utilizing an integrated 2D active antenna array architecture. Any of a wide variety of other functions could be supported in the eNB 102 by the controller/processor 425. In some embodiments, the controller/processor 425 includes at least one microprocessor or microcontroller.

The controller/processor 425 is also capable of executing programs and other processes resident in the memory 430, such as a basic OS. The controller/processor 425 can move data into or out of the memory 430 as required by an executing process.

The controller/processor 425 is also coupled to the backhaul or network interface 435. The backhaul or network interface 435 allows the eNB 102 to communicate with other devices or systems over a backhaul connection or over a network. The interface 435 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 435 could allow the eNB 102 to communicate over a wired or wireless local area network or over a wired or wireless connection to a larger network (such as the Internet). The interface 435 includes any suitable structure supporting communications over a wired or wireless connection, such as an Ethernet or RF transceiver.

The memory 430 is coupled to the controller/processor 425. Part of the memory 430 could include a RAM, and another part of the memory 430 could include a Flash memory or other ROM.

As described in more detail below, the transmit and receive paths of the eNB 102 (implemented using the RF transceivers 410a-410n, TX processing circuitry 415, and/or RX processing circuitry 420) support communication with aggregation of FDD cells and TDD cells.

Although FIG. 4 illustrates one example of an eNB 102, various changes may be made to FIG. 4. For example, the eNB 102 could include any number of each component shown in FIG. 4. As a particular example, an access point could include a number of interfaces 435, and the controller/processor 425 could support routing functions to route data between different network addresses. As another particular example, while shown as including a single instance of TX processing circuitry 415 and a single instance of RX processing circuitry 420, the eNB 102 could include multiple instances of each (such as one per RF transceiver).

Figure 5:
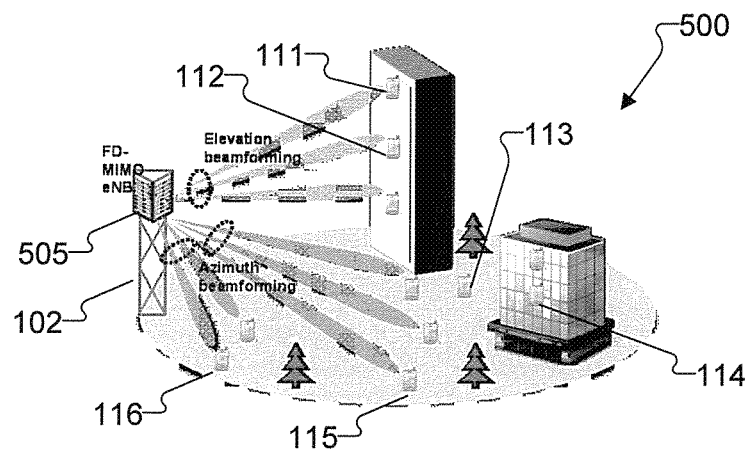
FIG. 5 illustrates a Full Dimensional MIMO (FD-MIMO) system according to this disclosure.

FIG. 5 illustrates a Full Dimensional MIMO (FD-MIMO) system according to this disclosure. The embodiment of the FD-MIMO system 500 shown in FIG. 5 is for illustration only. Other embodiments could be used without departing from the scope of the present disclosure.

FD-MIMO has emerged as a promising technology to significantly increase system capacity. In FD-MIMO, eNB 102 deploys a large number of active antenna elements in a two-dimensional plane. That is, eNB 102 employs one or more 2D active antenna arrays 505. The eNB 102 can send signals to and receive signals from one or more of UEs 111-116. For example, eNB 102 can use elevation beamforming to UES 111 and 112 and use azimuth beamforming to UE 115 and 116, while UES 113 and 114 may either be unable to receive a signal or not scheduled for communication.

Figure 6:
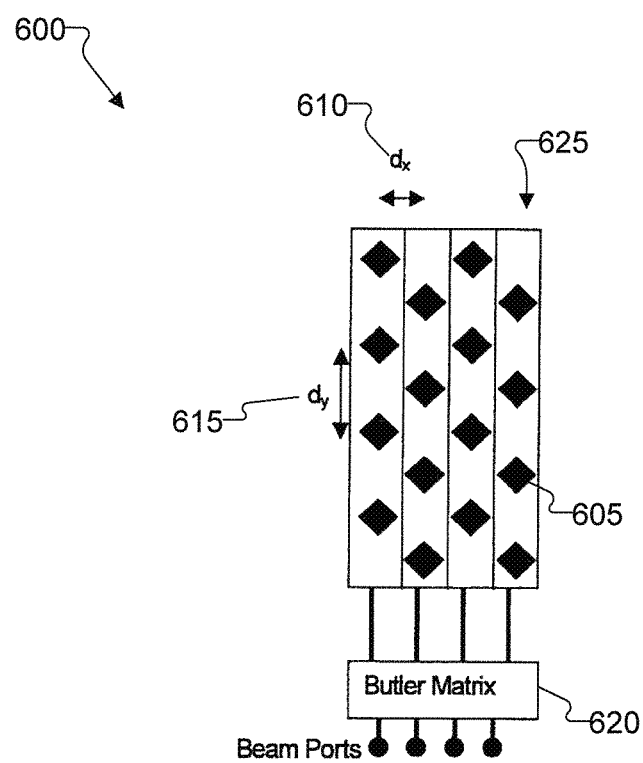
FIG. 6 illustrates an example antenna array system.

FIG. 6 illustrates an example antenna array system construction according to certain systems. The embodiment of the antenna array system 600 shown in FIG. 6 is for illustration only.

The antenna array system 600 includes a number of antenna elements 605. The antenna elements 605 are arranged with an equidistant $d_x$ 610 spacing in azimuth domain and an equidistant $d_y$ 615 spacing in elevation domain. A number of simultaneous fixed scanned beams may be generated in the azimuth plane by a Butler matrix 620 connected to respective antenna columns 625. Different variations of the design exist; however, the antenna elements are separated by an equal distance.

Figure 7:
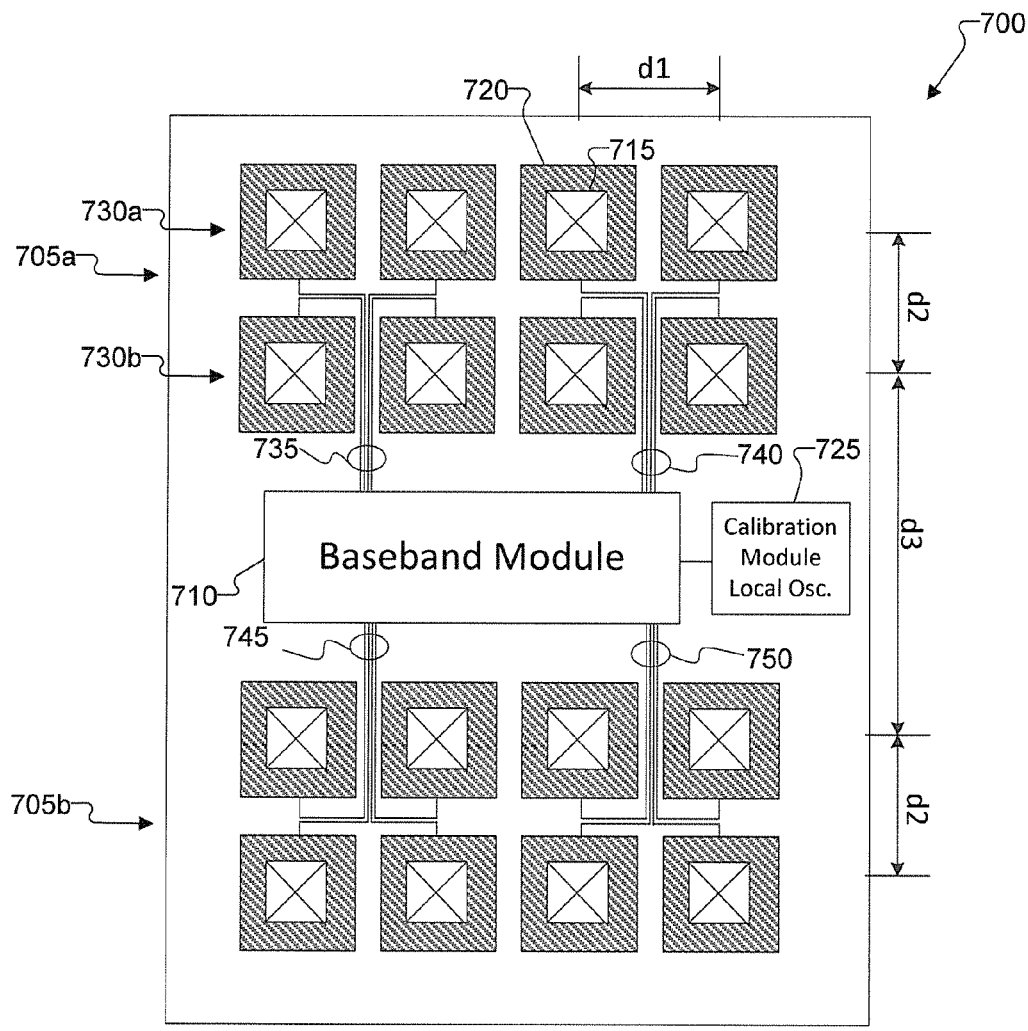
FIG. 7 illustrates an integrated antenna array system according to this disclosure.

FIG. 7 illustrates an integrated antenna array system according to this disclosure. The embodiment of the integrated antenna array system 700 shown in FIG. 7 is for illustration only. Other embodiments could be used without departing from the scope of the present disclosure.

In the example shown in FIG. 7, the integrated antenna array system 700 includes two 16-element sections 705a and 705b. The integrated 2D active antenna array system 700 includes baseband signal processing unit 710 (also referenced as a baseband module or baseband unit), a plurality of physical antenna elements 715, a plurality of RF transceiver modules 720 and a calibration module 725. The baseband signal processing unit 710 is disposed among the sections 705a and 705b such that the sections 705a and 705b are positioned symmetrically around the baseband signal processing unit 710. The sections 705a and 705b can be grouped logically, by electrical connection, or any suitable means provided that the sections 705a and 705b are symmetrically positioned around the baseband signal processing unit 710. It is noted that the symmetrical refers to each of the sections 705a and 705b having of exactly similar parts facing each other or around an axis defined by the baseband signal processing unit 710; showing symmetry between the sections 705a and 705b and the baseband signal processing unit 710.

The antenna elements 715 are spaced with d1 distance between elements in azimuth domain. A top section 705a of elements includes a first row 730a of the antenna elements and a second row 730b of the elements disposed at a d2 spacing apart from each other. A bottom section 705b of antenna elements, including third row 730c and fourth row 730d, has a symmetric configuration of the antenna elements 715 as the top section 705a of the integrated 2D active antenna array system 700. The top section 705a of the antenna array, including the first row 730a and second row 730b, and the bottom section 705b, including the third row 730c and fourth row 730d are separated by a d3 distance spacing. Illustration of each of the sections 705a and 705b has having two rows within is for ease of explanation and each of the sections 705a and 705b could have more or less rows and more or less antenna elements 715 or more or less RF transceiver modules 720. In certain embodiments, the integrated antenna array system 700 includes more than two sections 705.

The baseband signal processing unit 710 includes processing circuitry, such as one or more processors. The baseband signal processing unit 710 is coupled to the transceiver modules 720 and antenna elements 715 through equal length connection traces 735, 740, 745 and 750. A signal carried on these traces 735, 740, 745 and 750 can be analog baseband signal, analog intermediate frequency signal or high speed digital signal. The traces 735, 740, 745 and 750 are symmetric to each other.

The calibration module 725 includes processing circuitry, such as one or more processors and one or more local oscillation devices that produces a periodic, oscillating electronic signal, such as a crystal oscillator or electronic circuit. The calibration module 725 communicates with the baseband signal processing unit 710. The calibration module 725 also is connected to antenna elements 715 and the transceiver modules 720.

In certain embodiment, the integrated antenna array system 700 is mounted horizontally. That is, the depiction in FIG. 7 is rotated by ninety degrees. In this case, the non-uniform (larger) spacing between the top section 705a and the bottom section 705b due to the placement of the baseband signal processing unit 710 and calibration module 725 is introduced in the azimuth dimension. Embodiments of the present disclosure are not limited to any one specific orientation of the integrated antenna array system 700 and many different orientations could be employed without departing from the scope of the present disclosure. Additionally, the number of antenna elements 715 shown in the example illustrated in FIG. 7 for illustration only. Various embodiments of the integrated antenna array system 700 could include a different number of antenna elements 715, a different configuration of elements, or a combination thereof. In certain embodiments, the integrated antenna array system 700 includes one or more non-symmetrical sections, which could be similar to or different from sections 705a and 705b. In certain embodiments, the integrated antenna array system 700 is configured in three dimensions such that one or more sections 705a or 705b is disposed above or below the baseband signal processing unit 710.

Figure 8:
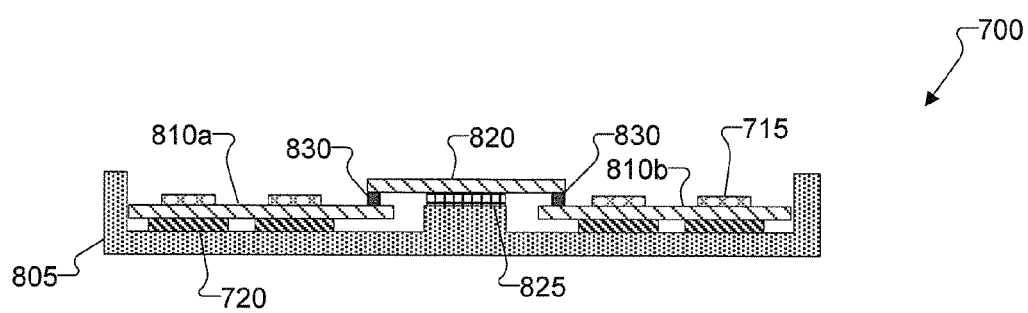
FIG. 8 illustrates a side view of the integrated antenna array system for wireless communication system according to this disclosure.

FIG. 8 illustrates a side view of the integrated antenna array system for wireless communication system according to this disclosure. The embodiment of the integrated antenna array system 700 shown in FIG. 8 is for illustration only. Other embodiments could be used without departing from the scope of the present disclosure.

The integrated antenna array system 700 includes a heat sink 805 that surrounds all the circuitry, such as the baseband signal processing unit 710, the antenna elements 715, the RF transceiver modules 720 and the calibration module 725. The heat sink 805 is configured to provide structure protection and heat dissipation. A mother board can be a single mother board element or include two or more separate boards. In the example shown in FIG. 8, the integrated antenna array system 700 includes a first mother board 810a and a second mother board 810b. The antenna elements 715 are mounted at a top of the mother boards 810a, 810b and RF transceiver modules 720 are mounted on a bottom of the mother boards 810a, 810b. The baseband signal processing unit 710 includes a baseband board 820 and a baseband processor 825. The baseband board 820 is connected to the mother boards 810a, 810b through respective connectors 830. The baseband processor 825 is mounted adjacent to the heat sink 805.

Figure 9:
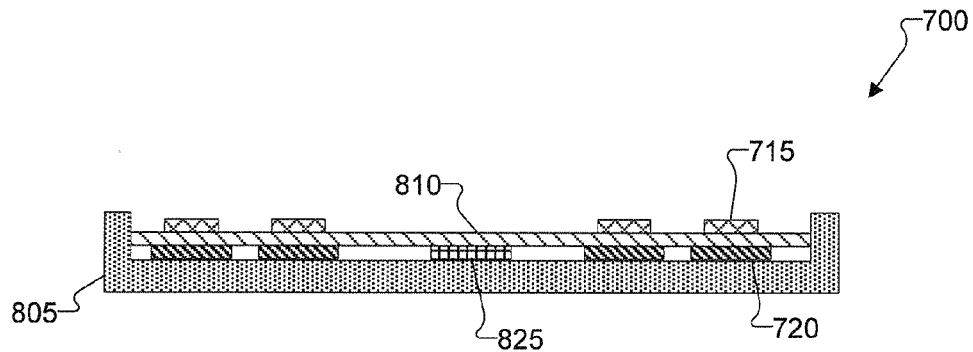
FIG. 9 illustrates a side view of another embodiment of the integrated antenna array system for wireless communication system according to this disclosure.

FIG. 9 illustrates another side view of the integrated antenna array system for wireless communication system according to this disclosure. The embodiment of the integrated antenna array system 700 shown in FIG. 9 is for illustration only. Other embodiments could be used without departing from the scope of the present disclosure.

The integrated antenna array system 700 includes a heat sink 805 that surrounds all the circuitry, such as the baseband signal processing unit 710, the antenna elements 715, the RF transceiver modules 720 and the calibration module 725. The heat sink 805 is configured to provide structure protection and heat dissipation. The mother board 810 comprises a single piece of PCB board. The antenna elements 715 are mounted at the top of the mother board 810 and RF transceiver modules 720 are mounted at a bottom of the mother board 810. The baseband processor 825 is mounted on the bottom of the mother board 810 adjacent to the heat sink 805.

Figure 10:
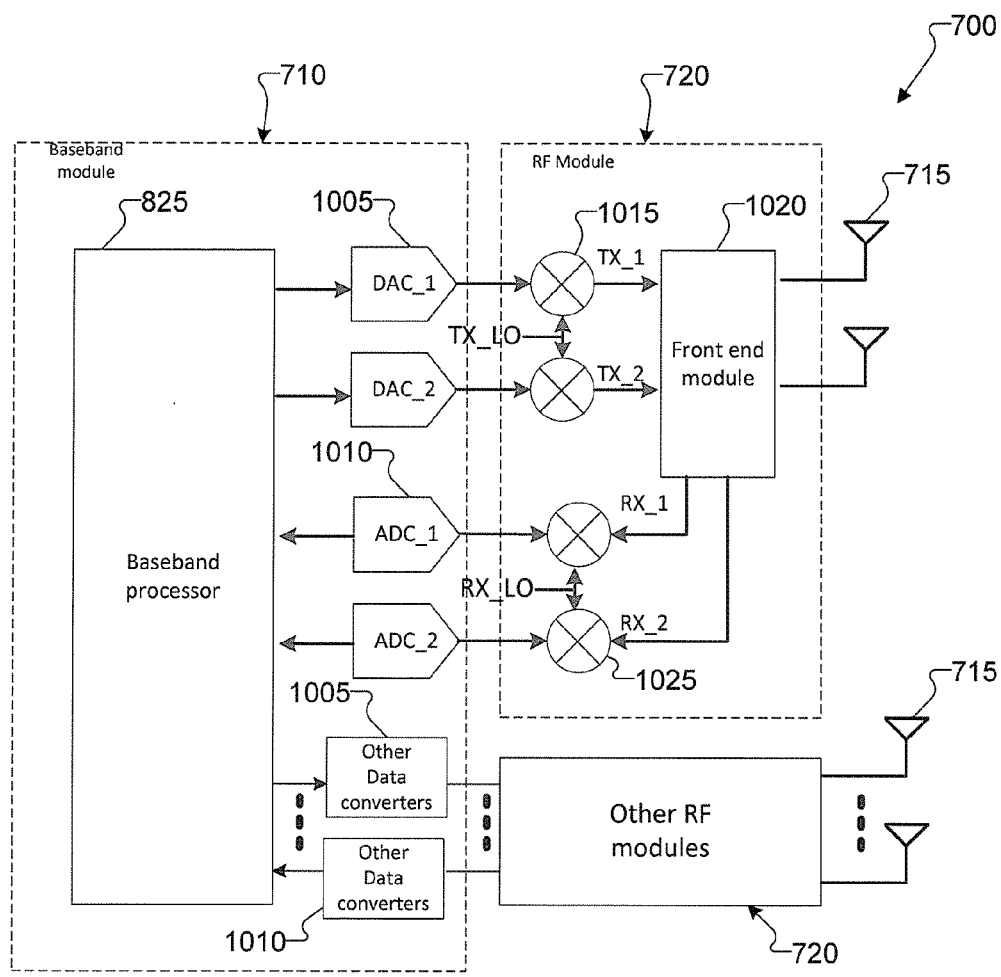
FIG. 10 illustrates processing circuitry of the integrated antenna array system for wireless communication system according to this disclosure.

FIG. 10 illustrates processing circuitry of the integrated antenna array system 700 for wireless communication system according to this disclosure. The embodiment of the integrated antenna array system 700 shown in FIG. 10 is for illustration only. Other embodiments could be used without departing from the scope of the present disclosure.

The integrated antenna array system 700 includes a baseband signal processing unit 710, multiple RF transceiver modules 720 and antenna elements 715. The baseband signal processing unit 710 includes a baseband processor 825. The baseband processor 825 can be digital signal processor (DSP), field-programmable gate array (FPGA), or application-specific integrated circuit (ASIC). Signals transmitted by the baseband processor 825 are converted to the analog signals by one or more digital-to-analog converters (DACs) 1005 the transmitted to the RF modules 720. Signals received by the baseband signal processing unit 710 are converted to the digital signals by one or more analog-to-digital (ADCs) 1010. The analog transmitted signals are processed through one or more transmit (TX) mixers 1015 and a front end module 1020 and transmitted via one or more of the antenna elements 715. Analog transmitted signals are modulated to RF frequency by using the TX mixers 1015 with transmit (TX) local oscillator (LO) frequency. In the receive paths, the RF signals are received via one or more antenna elements 715, processed by the front end module 1020 and are down-converted by one or more RF mixers 1025 into the intermediate frequency (IF) signals or baseband signals.

Figure 11:
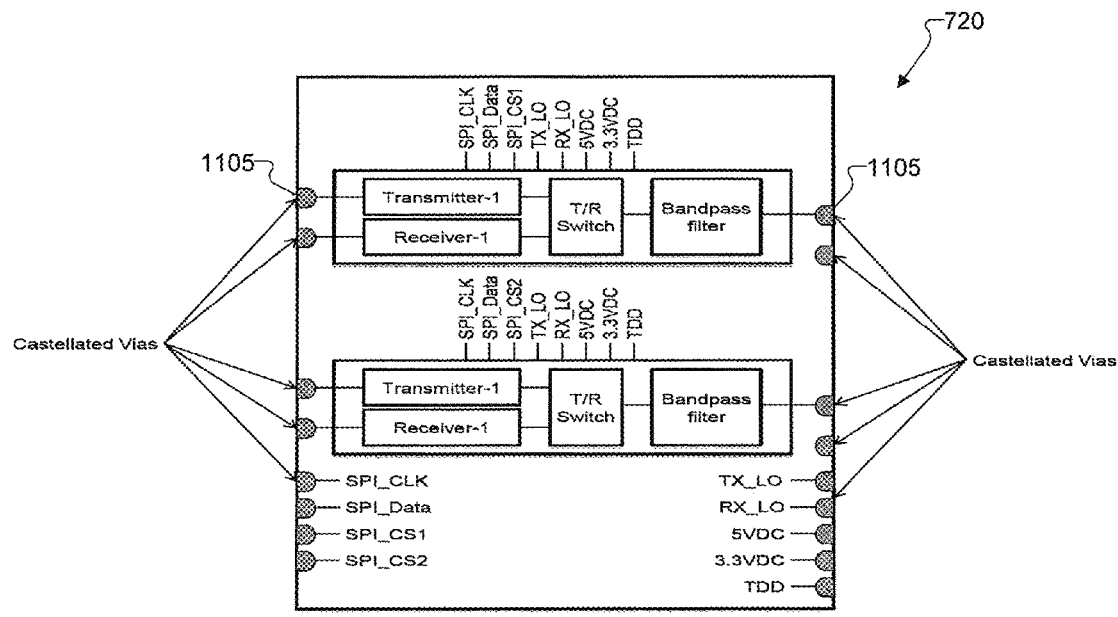
FIG. 11 illustrates a schematic diagram of a 2×2 RF transceiver module according to this disclosure.

FIG. 11 illustrates a schematic diagram of a 2×2 RF transceiver module according to this disclosure. The embodiment of the 2×2 RF transceiver module 720 shown in FIG. 11 is for illustration only. Other embodiments could be used without departing from the scope of the present disclosure.

In the example shown in FIG. 11, the 2×2 RF transceiver module 720 includes castellated vias 1105. The RF transceiver module 720 can be mounted on copper pads on the mother board 810 and transfer RF, digital and DC signals to and from the antenna 715 and baseband board 820. For example, the castellated vias 1105 are configured to transfer RF, digital and DC signals from the RF module to the antenna elements 715 and baseband unit.

Figure 12:
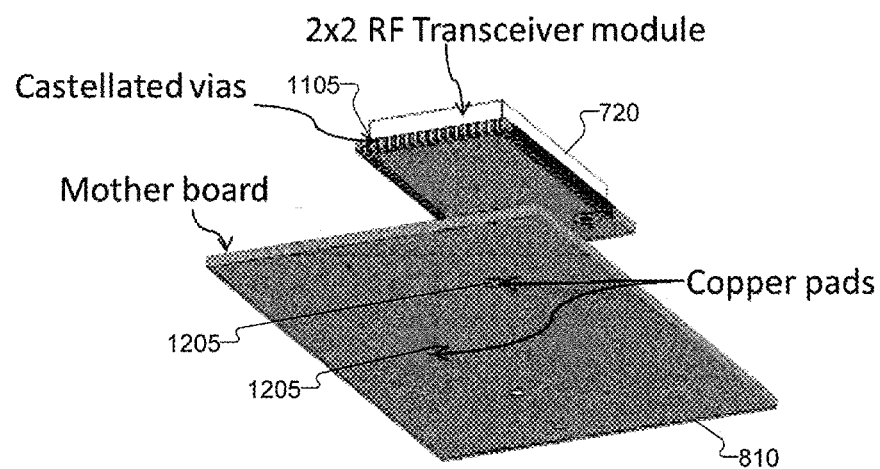
FIG. 12 illustrates a 2×2 RF transceiver module and motherboard connection according to this disclosure.

FIG. 12 illustrates a 2×2 RF transceiver module 720 and motherboard 810 connection according to this disclosure. The embodiment of the 2×2 RF transceiver module 720 shown in FIG. 12 is for illustration only. Other embodiments could be used without departing from the scope of the present disclosure.

In the example shown in FIG. 12, 2×2 RF module 720 is connected to copper pads 1205 on the mother board 810 with castellated vias 1105. The castellated vias 1105 is configured to carry RF, digital and DC signals from the 2×2 RF module 720 to the antenna elements and baseband unit.

Figure 13:
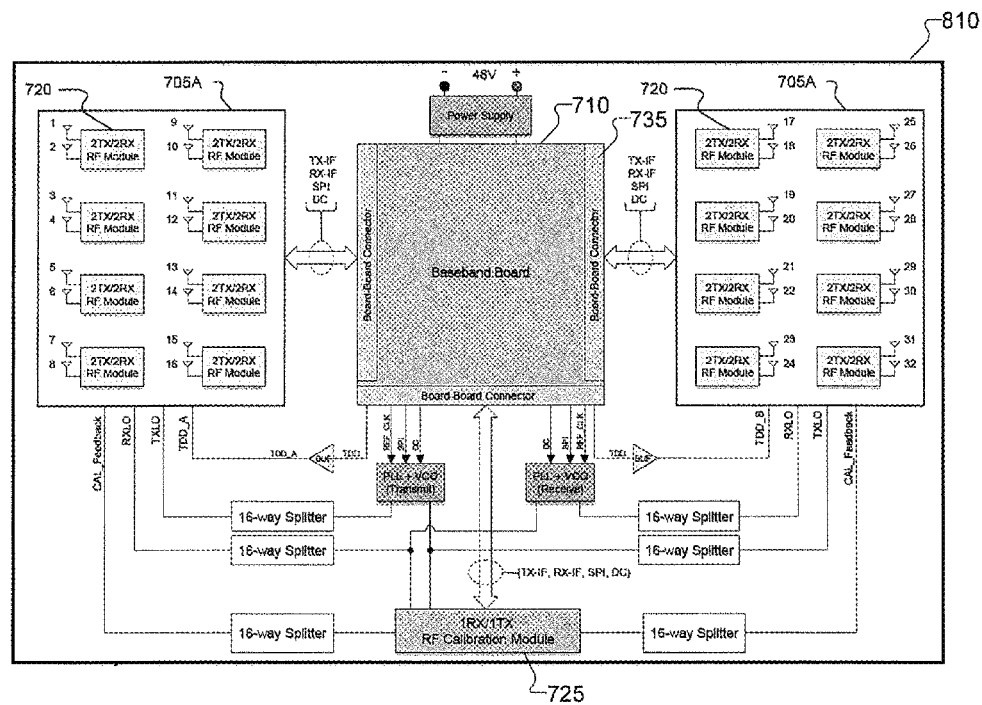
FIG. 13 illustrates portions of the integrated antenna array system mounted on a motherboard according to this disclosure.

FIG. 13 illustrates portions of the integrated antenna array system 700 mounted on a motherboard 810 according to this disclosure. The embodiment of the integrated antenna array system 700 mounted on a motherboard 810 shown in FIG. 13 is for illustration only. Other embodiments could be used without departing from the scope of the present disclosure.

In the schematic representation shown in FIG. 13, the portions of the integrated antenna array system 700 mounted on motherboard 810 include RF modules 720 and baseband signal processing unit 710 with critical traces shown. In certain embodiments, the baseband signal processing unit 710 is placed at the center of the mother board 810 and the active antenna array 705 elements are split into two sections 705a, 705b on either side of the baseband signal processing unit 710. The configuration in which the baseband signal processing unit 710 is disposed at the center and the active antenna array 705 split into two sections 705a, 705b leads to easy distribution of critical, phase or length matched lines carrying RF signals, LO signals or calibration circuit related signals. This configuration is very crucial to achieving easy phase and length matching of critical signal lines, such as the LO signals, RF signals, ADC and DAC signals, as well as the calibration circuit lines. In addition, the larger than 1λ spacing between the two antenna array sections 705a, 705b facilitates increased system capacity.

Figure 14A:
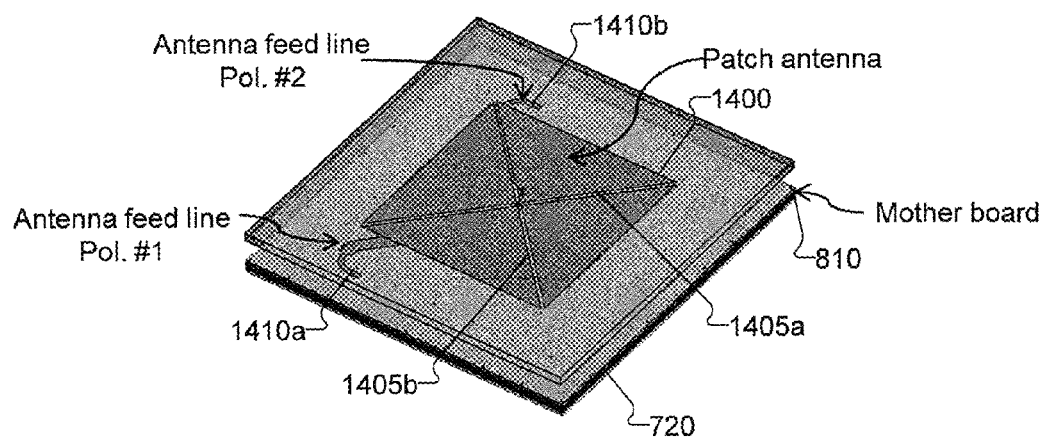
FIGS. 14A and 14B illustrate an antenna element according to this disclosure.
Figure 14B:
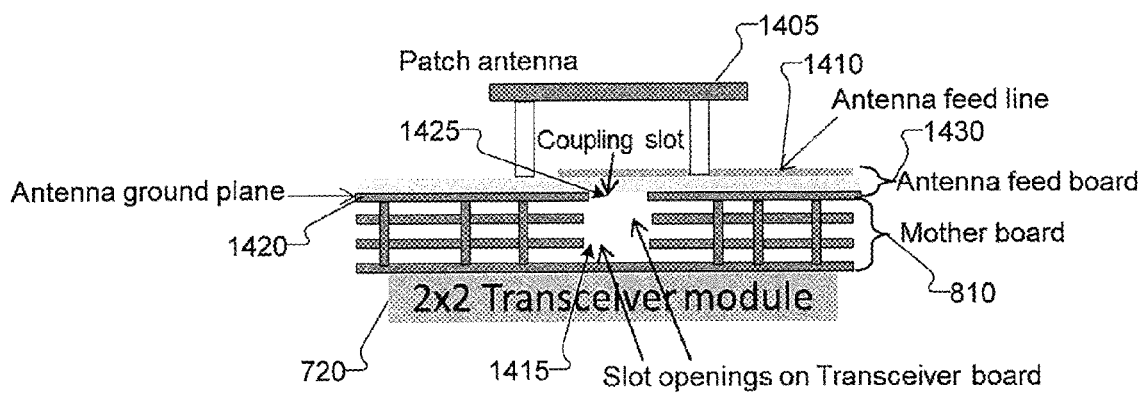

FIGS. 14A and 14B illustrate an antenna element according to this disclosure. FIG. 14A illustrates a plan view schematic representation of the antenna configuration having wideband dual-linear diagonally(±45°)polarized patch antenna with wideband performance including feeding technique and installation on mother board. FIG. 14B illustrates a cross-section view schematic representation of the antenna configuration. The embodiments of the antenna element shown in FIGS. 14A and 14B are for illustration only. Other embodiments could be used without departing from the scope of the present disclosure.

In certain embodiments, the antenna element 715 is a patch antenna element 1400 configured with dual-linear diagonally polarized(±45°)patch antenna elements 1405 with wideband performance (12% bandwidth). Separate ports 1410 are provided for each polarization. For example, a first feed line 1410a feeds a first patch antenna element 1405a and a second feed line 1410b feeds a second patch antenna element 1405b. The patch antenna 1400 is fed by a slot opening 1415 on an antenna ground plane 1420, which comprises a top layer of a multilayer mother board 810. The patch antenna 1400 includes a coupling slot 1425 in the antenna feed board 1430 and disposed to be adjacent to the slop opening 1415. A 2×2 (2TX and 2RX) RF transceiver module 720 is disposed under each patch antenna element 1400 on the bottom side of the mother board 810 and is electrically connected to the respective patch antenna element 1400. Routing from the baseband module to the RF transceiver modules 720 is easily accomplished as a result of the proximity of the baseband board 820, which includes or is otherwise coupled to the baseband processor 825, is located at a center of the antenna array, that is the integrated antenna array system 700.

Figure 15:
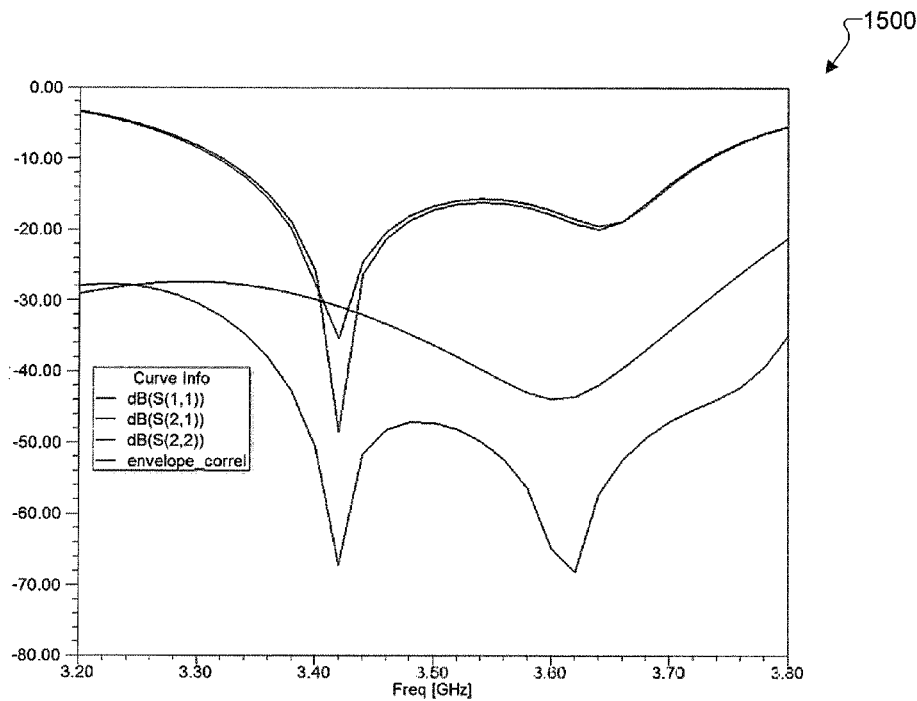
FIG. 15 illustrates S-parameters and envelop correlation curves for the dual polarized wideband antenna element according to this disclosure.

FIG. 15 illustrates S-parameters and envelop correlation curves for the dual polarized wideband antenna element according to this disclosure. The graph 1500 shown in FIG. 15 is for illustration only and representative of an illustrative example only. In one example, the integrated antenna array system 700 includes a spacing of d1=0.75λ, d2=1λ, and d3=2.5λ that is chosen so as to maximize system capacity and minimize coupling and envelop correlation between antenna elements. Other values generating other S-parameters and envelop correlation curves could be used without departing from the scope of the present disclosure.

Figures 16A, 16B, 16C:
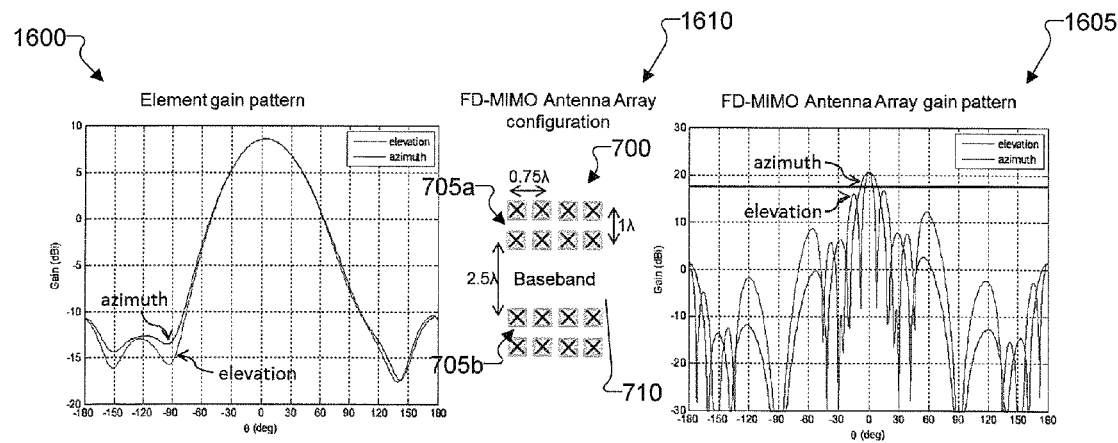
FIGS. 16A, 16B and 16C illustrate a simulated antenna element gain pattern and corresponding antenna array configuration according to this disclosure.

FIGS. 16A, 16B and 16C illustrate a simulated antenna element gain pattern and corresponding antenna array configuration according to this disclosure. The graphs 1600, 1605 shown in FIGS. 16A and 16C are for illustration only and representative of one example only. As seen, the integrated antenna array system 700 is designed to have equal beam-widths in elevation and azimuth. The integrated antenna array system 700 configuration 1610 also is shown in FIG. 16B. To accommodate the baseband signal processing unit 710 at the center of integrated antenna array system 700 is divided into two sections 705a, 705b, placed above and below the baseband unit, respectively. This arrangement provides the benefit of symmetric trance routing of the critical digital and RF signals and can be particularly useful as the antenna number increases. Moreover, the splitting of the antenna array into two sections 705a, 705b creates a larger than 1λ, separation, such as in the particular example d3=2.5λ, between the antenna elements and thus narrower beam-widths in the elevation domain, as seen in the antenna array beam pattern 1605. The 2.5λ spacing provided for higher system capacity, compared to a uniformly spaced antenna array, despite the occurrence of side lobes.

System Level (Geometry-Based) Simulation Assumptions

TABLE 1 lists assumptions used in system-level simulation.

TABLE 1

| System level simulation assumptions | |
|---|---|
| Channel Model | 3 DUMa |
| Frequency | 10 MHz @ 3.5 GHz |
| Small cell dropping | 4 small cells randomly dropped with each cluster |

TABLE 1-continued

| System level simulation assumptions | |
|---|---|
| Channel Model | 3 DUMa |
| UE dropping | 80% indoor, 20% outdoor, uniformly dropped across 8 floors |
| eNB transmit power | 30 dBm |
| Antenna element pattern | HPBW: 65°@ azimuth, 40°@ elevation; Gain: 10 dBi |
| Antenna placement | 12° electric down-tilting, height 10 m |
| Scheduling | Full bandwidth for all UEs |
| Precoding | Conjugate beamforming |
| UE receiver | 2 antennas with MMSE IRC |
| Channel state information (CSI) | Ideal CSI |

TABLE 2 summarizes three antenna and RF configurations investigated. All three configurations have thirty-two antennas. Configuration-1 and configuration-2 are typical uniform rectangular array, with configuration-2 being a 90-degree rotated version of configuration 1, while configuration-3 is a non-uniform rectangular array with a gap between two groups.

Figure 17:
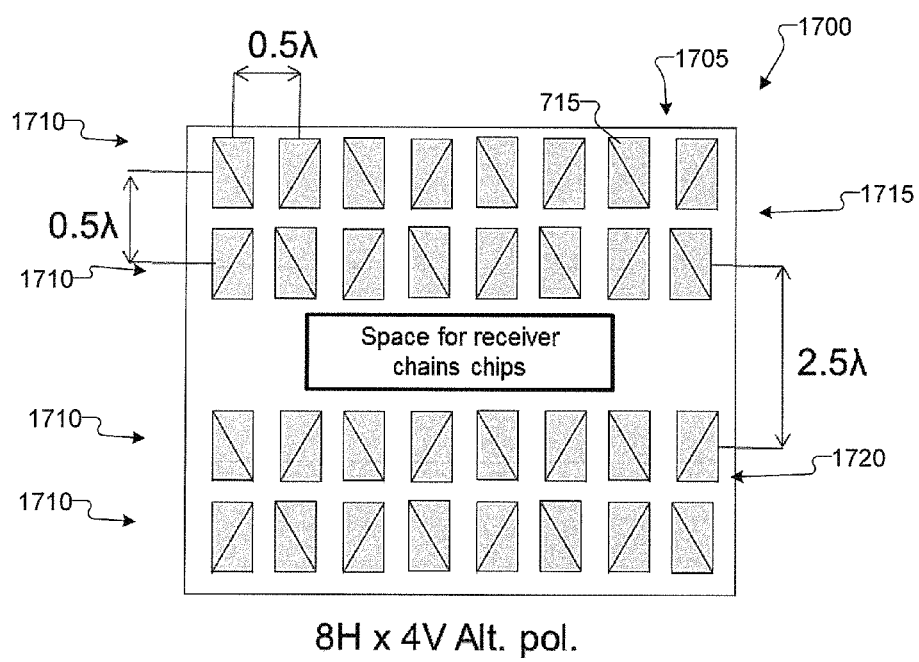
FIG. 17 illustrates an array configuration-3 of the integrated antenna array system according to this disclosure.

FIG. 17 illustrates an array configuration-3 of the integrated antenna array system according to this disclosure. The embodiment of configuration-3 1700 shown in FIG. 17 is for illustration only. Other embodiments could be used without departing from the scope of the present disclosure.

In configuration-3, there are eight columns 1705 of antennas 710 placed in horizontal and four rows 1717 of antennas 710 placed in vertical, where each column 1705 consists of four antenna elements and each row 1710 consists of eight antenna elements. The first and second rows are formed as one group 1715 and the third and fourth rows 1720 are formed as another group. The first group 1715 and second group 1720 are placed 2.5 wavelength away (non-uniform placement.

TABLE 2

| Summary of antenna and RF configurations investigated | | |
|---|---|---|
| Array configuration index | Array configuration (H-spacing (d1), center gap(d3), V-spacing (d2)) | Form factor (H × V) |
| 1 | 8H × 4 V (0.5, 0.5, 0.5) | 0.34 m × 0.17 m |
| 2 | 4H × 8 V (0.5, 0.5, 0.5) | 0.17 m × 0.34 m |
| 3 | 8H × 4 V (0.5, 2.5, 0.5) | 0.34 m × 0.38 m |

System Level (Geometry-based) Simulation Results

TABLE 3 summarizes simulation results for three antenna and RF configurations, comparing against a baseline method (clustered small cell solution). Configuration-2 consistently attains the best performance among the three configurations: 53.6% gain in 5 percentile (% tile) throughput, 57.1% gain in 50% tile (median) throughput and 74.4% gain in 95% tile. Results show that having a non-uniform rectangular array as configuration-2, that is, a separation placed among two or more antenna groups is superior to other configurations.

TABLE 3

Summary of simulation results

| Configuration | 5% ile throughput (bps/Hz) | 50% ile throughput (bps/Hz) | 95% ile throughput (bps/Hz) | Cluster sum rate (bps/Hz) |
| --- | --- | --- | --- | --- |
| 1 | 0.1(44.9%) | 0.386(7.5%) | 2.152(74.1%) | 3.332(35%) |
| 2 | 0.083(20%) | 0.272(−24.2%) | 1.624(31.3%) | 2.423(−1.8%) |
| 3 | 0.106(53.6%) | 0.564(57.1%) | 2.153(74.1%) | 4.086(65.5%) |
| Baseline (small cell clusters) | 0.069 | 0.359 | 1.236 | 2.468 |

9.5.3 Link Level Simulation Assumptions

TABLE 4 lists assumptions used in link level simulation. The simulations are conducted over four hundred random realizations of the channel, each realization with a duration of four hundred sub-frames.

TABLE 4

Summary of link level simulation assumptions

| | |
| --- | --- |
| Channel Model | 3 D ITU, NLoS |
| Frequency | 10 MHz @ 3.5 GHz |
| UE placement | Random dropping |
| Scheduling | Full bandwidth for all UEs |
| Precoding | SLNR or conjugate beamforming |
| UE receiver | 2 antennas with MMSE IRC |
| Channel state information (CSI) | Ideal CSI |
| CQI | MU CQI prediction |
| Link adaptation | Yes |

9.5.4 Link Level Simulation Results

Figure 18:
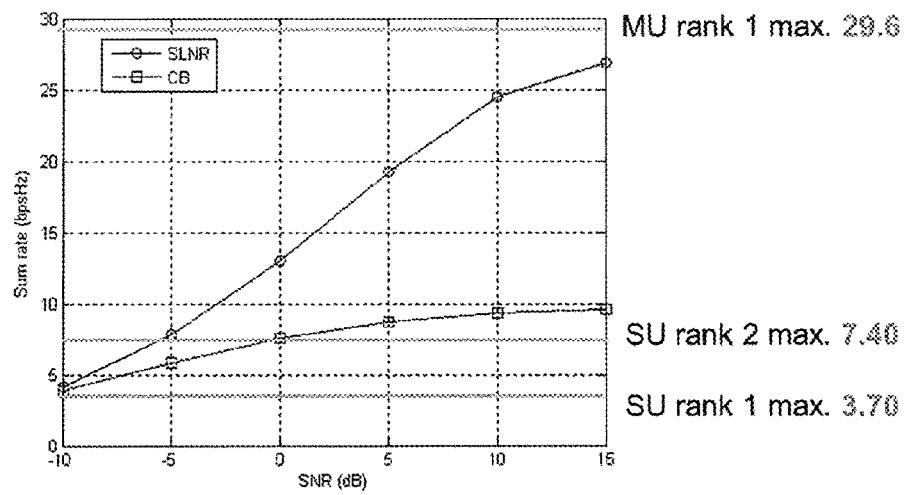
FIG. 18 illustrates a link level simulation results with the proposed RF and antenna architecture according to this disclosure.

FIG. 18 illustrates a link level simulation results with the proposed RF and antenna architecture according to this disclosure. The illustration of the link level simulation results is for example purposes only and other simulations and results could be achieved.

Two precoding methods are evaluated: conjugate beamforming (CB) and signal-to-leakage ratio minimization (SLNR). Using SLNR precoding, the proposed architecture for the integrated antenna array system 700 attains 27 bps/Hz at 15 dB, which is almost the maximum sum rate can be attained by 8 UE MU-MIMO with rank 1 transmission (that is 29.6 bps/Hz), and attains 7.3× gain compared with SU rank 1 and 3.6× gain compared with SU with rank 2.

Figure 19:
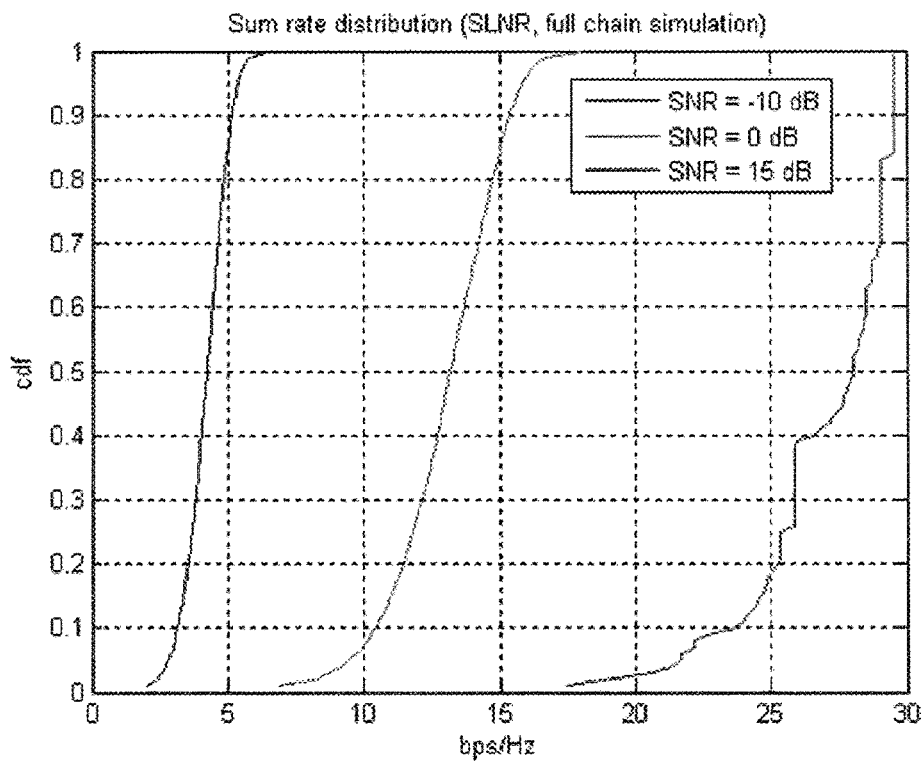
FIG. 19 illustrates sum rate distribution of SLNR precoding according to this disclosure.

FIG. 19 illustrates sum rate distribution of SLNR precoding according to this disclosure. The illustration of the sum rate distribution of SLNR results is for example purposes only and other results could be achieved.

The results are summarized in TABLE 5, from which it is apparent that at high SNR, the median of sum-rate is 28 bps/Hz which is almost the same as the optimal sum-rate of 29 bps/Hz.

TABLE 5

Median sum-rate of SLNR under different SNR

| SNR (dB) | −10 | 0 | 15 |
| --- | --- | --- | --- |
| Sum rate (SLNR) Bps/Hz | 4.7 | 13 | 28 |

Figure 20:
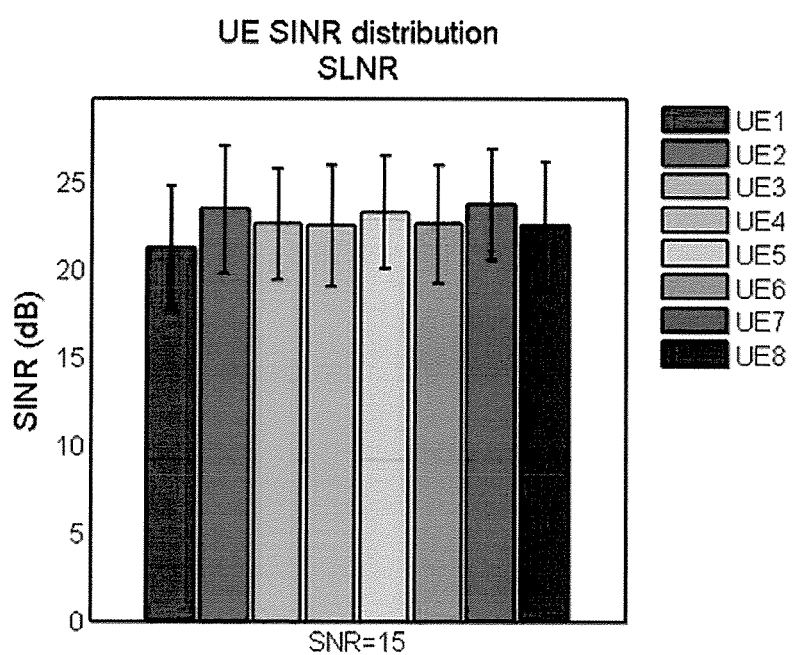
FIG. 20 illustrates SINR distribution analysis according to this disclosure.

FIG. 20 illustrates SINR distribution analysis according to this disclosure. The illustration of the SINR distribution analysis results is for example purposes only and other results could be achieved. It is apparent that with SLNR, the proposed architecture maintains high SINR for all UEs, ranging roughly from 15 to 29 dB.

In integrated large antenna array system for wireless communication system, the form factor, array performance, hardware layout and heat dissipation are the four main challenges.

In certain embodiments, antenna elements are placed with certain distance in order to minimize the coupling of the antenna elements, which can cause interference among different antenna elements. In addition, the form factor of the integrated unit, in terms of width, length and depth, is small enough so the deployment can be flexible, for example on the lamp poles, ceiling, side wall of the building and so forth. In many deployment scenarios, the size and weight of the unit are the major considerations. Therefore it is important to reduce the form factor of the unit.

Secondly a major factor to determine communication system performance in terms of capacity for the antenna array system is the aperture size. The aperture size in the elevation domain dominates the system level performance. The system level design tradeoff includes increasing the elevation domain aperture without sacrificing the overall unit size. By separating the antenna arrays into two sections, a space is left between the two sections; therefore the aperture size is increased in elevation domain. Meanwhile, the space in the middle is filed by the baseband module.

Thirdly, in large scale 2D active antenna array hardware layout, the routing and distribution of the high frequency and wide bandwidth analog signals or high speed digital signals are a major challenge. The signals could have cross-talk on the PCB board that causes interference. Also the data path signals need to be length matched in order to achieve uniform signal propagation across the entire unit. A symmetric and centralized baseband module, as illustrated in embodiments of the present disclosure, makes it easier to route the signals in a symmetrical way, therefore reducing the overall length of the traces and also the cross-talk among the traces.

Lastly, the heat dissipation of the large scale 2D active antenna array system is critical to achieve good performance of the system. Normally for outdoor deployment, the unit cannot have the cooling fan mainly due to the reliability reasons (no moving parts). The integrated unit has many active components, including PA, transceivers, baseband unit and power supplies. In embodiments of the present disclosure, these units dissipate the heat using the heat sink to keep the junction temperature below the breakdown threshold. To maximize the usage of the heat sink, the active components are evenly distributed.

In the conventional 1D active antenna array system, because the number of the antennas is small, the PAs are configured to output at relatively high power. The heat generated by PAs dominates the overall heat generated by the unit. In large 2D antenna array system however, the number of the transceiver chains is large. Therefore each individual PA can have relatively lower output power. Alternatively, the baseband unit needs to consume higher percentage of the power due to extensive signal processing of multiple channels.

By having the centralized baseband unit, the baseband processor can dissipate the heat evenly across the entire heat sink. This will in turn reduce the thickness of the heat sink because larger area of the heat sink is available for heat dissipation. To ensure easy physical access to the baseband unit as well as adequate heat dissipation, the baseband unit is installed on top of the mother board towards the front (open) face of the unit.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An integrated antenna array system comprising:
    a baseband signal processing unit configured to perform baseband functions; and
    a plurality of physical antenna elements disposed in groups in two sections, each of the groups comprising an equal number of the plurality of physical antenna elements, wherein the groups are disposed on a plane and on substantially opposite sides of the baseband signal processing unit.

2. The integrated antenna array system as set forth in claim 1, wherein the plurality of antenna groups in each of the two sections are placed with a first equal spacing in one dimension and a second equal spacing in another dimension.

3. The integrated antenna array system as set forth in claim 1, wherein the at least one physical antenna element are dual-polarized.

4. The integrated antenna array system as set forth in claim 1, wherein each of the plurality of physical antenna elements is coupled to and fed by a respective radio frequency (RF) transceiver module.

5. The integrated antenna array system as set forth in claim 1, wherein the baseband signal processing unit is disposed between the two sections.

6. The integrated antenna array system as set forth in claim 1, further comprising at least one analog-to-digital converter and at least one digital-to-analog converter coupled to the baseband signal processing unit.

7. The integrated antenna array system as set forth in claim 1, wherein each of the plurality of physical antenna elements is coupled to the baseband signal processing unit through a respective trace, and wherein a length of traces between the two sections and the baseband signal processing unit are matched.

8. The integrated antenna array system as set forth in claim 7, further comprising a plurality of data converters, wherein the baseband signal processing unit and the data converters are configured to send downlink signals and receive uplink signals through matched-length traces to and from the RF transceivers.

9. The integrated antenna array system as set forth in claim 7 wherein each of the plurality of physical antenna elements is connected to a phase shifter and wherein a group of phase shifters is coupled to and fed by a respective radio frequency (RF) transceiver module.

10. The integrated antenna array system as set forth in claim 1, further comprising a calibration module disposed between the two sections.

11. The integrated antenna array system as set forth in claim 10, wherein each of the plurality of physical antenna elements is coupled to and fed by a respective RF transceiver module and wherein each of the RF transceiver modules comprises a transmitter and a receiver, and wherein the calibration module configured to measure at least one signal at the transmitters of the two sections; or at measure at least one signal at the receivers of the two sections.

12. The integrated antenna array system as set forth in claim 11, wherein the calibration module configured to measure phase variation at the transmitters of the two sections; or at measure phase variation at the receivers of the two sections.

13. The integrated antenna array system as set forth in claim 1, further comprising a local oscillator disposed between two sections of antenna array and is distributed to the two sections by matched length traces.

14. The integrated antenna array system as set forth in claim 1, further comprising a motherboard configured to host the plurality of physical antenna elements and the baseband signal processing unit.

15. The integrated antenna array system as set forth in claim 14, wherein the mother board hosts a plurality of RF transceiver modules that respectively feeds the plurality of physical antenna elements, and wherein each of the plurality of RF transceiver modules is disposed directly under a respective physical antenna element.

16. The integrated antenna array system as set forth in claim 15, wherein RF and digital signals are communicated between the plurality of physical antenna elements, the plurality of RF transceiver modules, the motherboard, and a baseband board supporting the baseband signal processing unit.

17. The integrated antenna array system as set forth in claim 15, wherein the plurality of RF transceiver modules are connected to the mother board through a number of castellated vias.

18. The integrated antenna array system as set forth in claim 17, wherein RF signals are exchanged between the plurality of RF transceiver modules and the plurality of physical antenna elements through the number of the castellated vias.

19. The integrated antenna array system as set forth in claim 1, wherein the baseband signal processing unit is disposed between two of the groups.

20. A base station comprising:
    a processor configured to control a beamforming transmission or reception; and
    an integrated antenna array system comprising:
        a baseband signal processing unit configured to perform baseband functions and disposed between two sections; and
        a plurality of physical antenna elements disposed in groups in the two sections, each of the groups comprising an equal number of the plurality of physical antenna elements, wherein the groups are symmetrically around the baseband signal processing unit.

21. The base station as set forth in claim 20, wherein each of the plurality of antenna elements comprise a dual-linear diagonally polarized patch antenna.

* * * * *